(12) United States Patent
Pillai et al.

(10) Patent No.: US 10,997,030 B2
(45) Date of Patent: May 4, 2021

(54) DISASTER RECOVERY AS A SERVICE

(71) Applicant: EMC IP Holding Company LLC, Hopkinton, MA (US)

(72) Inventors: Biju Shanmugham Pillai, Pune (IN); Nathan Rosenblum, San Francisco, CA (US); Niraj Tolia, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 306 days.

(21) Appl. No.: 14/675,405

(22) Filed: Mar. 31, 2015

(65) Prior Publication Data

US 2016/0292045 A1  Oct. 6, 2016

(51) Int. Cl.
| | |
|---|---|
| *G06F 11/14* | (2006.01) |
| *G06F 16/182* | (2019.01) |
| *G06F 16/174* | (2019.01) |
| *G06F 9/54* | (2006.01) |
| *G06F 21/62* | (2013.01) |
| *G06F 9/455* | (2018.01) |

(52) U.S. Cl.
CPC .......... *G06F 11/1435* (2013.01); *G06F 9/544* (2013.01); *G06F 9/545* (2013.01); *G06F 11/1464* (2013.01); *G06F 11/1469* (2013.01); *G06F 16/1748* (2019.01); *G06F 16/183* (2019.01); *G06F 21/6218* (2013.01); *G06F 2009/45562* (2013.01); *G06F 2201/80* (2013.01); *G06F 2201/84* (2013.01)

(58) Field of Classification Search
USPC ....................................................... 707/654
See application file for complete search history.

(56) References Cited

U.S. PATENT DOCUMENTS

| | | | |
|---|---|---|---|
| 8,788,769 B2 | 7/2014 | Abercrombie et al. | |
| 8,904,126 B2 | 12/2014 | Ashutosh et al. | |
| 9,170,892 B2* | 10/2015 | Nightingale | ........ G06F 11/1658 |
| 9,454,441 B2* | 9/2016 | Elson | .................. G06F 11/1662 |
| 9,720,619 B1* | 8/2017 | Shah | ........................ G06F 3/065 |
| 2003/0182301 A1* | 9/2003 | Patterson | ............. G06F 11/1458 |
| 2005/0066095 A1* | 3/2005 | Mullick | ............... G06F 16/1774 |
| | | | 710/200 |
| 2007/0088768 A1* | 4/2007 | Passerini | ............. G06F 11/1435 |
| 2008/0005201 A1* | 1/2008 | Ting | ...................... G06F 11/1435 |
| 2008/0082856 A1* | 4/2008 | French | ................ G06F 11/2089 |
| | | | 714/2 |
| 2008/0109448 A1* | 5/2008 | Aboel-Nil | ............ G06Q 10/107 |
| 2010/0191783 A1* | 7/2010 | Mason | .............. G06F 17/30088 |
| | | | 707/822 |
| 2014/0006354 A1 | 1/2014 | Parkison | |
| 2014/0074790 A1* | 3/2014 | Berman | ............. G06F 17/3007 |
| | | | 707/649 |
| 2014/0181051 A1 | 6/2014 | Montulli et al. | |

(Continued)

*Primary Examiner* — Tamara T Kyle
*Assistant Examiner* — Raheem Hoffler
(74) *Attorney, Agent, or Firm* — Chamberlain, Hrdlicka, White, Williams & Aughtry

(57) ABSTRACT

Providing disaster recovery of a distribute file system metadata server as a service is disclosed. In various embodiments, an indication is received to provide alternative access to a file system metadata server. A copy of a self-describing backup of the file system metadata server is obtained, e.g., from cloud-based storage. The backup is used to provide access to a read only instance of the file system metadata server.

25 Claims, 14 Drawing Sheets

(56) References Cited

U.S. PATENT DOCUMENTS

| | | | |
|---|---|---|---|
| 2014/0189432 A1* | 7/2014 | Gokhale | G06F 17/30289 |
| | | | 714/41 |
| 2014/0281514 A1 | 9/2014 | Erofeev | |
| 2014/0372384 A1* | 12/2014 | Long | G06F 16/21 |
| | | | 707/679 |
| 2016/0004721 A1* | 1/2016 | Iyer | G06F 16/184 |
| | | | 707/649 |
| 2016/0124663 A1* | 5/2016 | Mitkar | G06F 16/1734 |
| | | | 711/162 |
| 2016/0210198 A1* | 7/2016 | Durge | G06F 11/1453 |
| 2018/0137013 A1* | 5/2018 | Poojary | G06F 3/0619 |

* cited by examiner

DISASTER RECOVERY AS A SERVICE

BACKGROUND OF THE INVENTION

Distributed file system metadata servers may reside in an enterprise or other network that may become inaccessible to some clients and/or applications that are not on the same network. In some cases, an enterprise or other owner, operator, and/or user of a distributed file system may not have the infrastructure in place and/or the in house expertise required to be able to provide for timely recovery of the file system metadata server in the event of a catastrophic loss, e.g., a non-recoverable hardware failure or a fire or other destructive event affecting a large portion of the enterprise's IT infrastructure.

BRIEF DESCRIPTION OF THE DRAWINGS

Various embodiments of the invention are disclosed in the following detailed description and the accompanying drawings.

DETAILED DESCRIPTION

Figure 1:
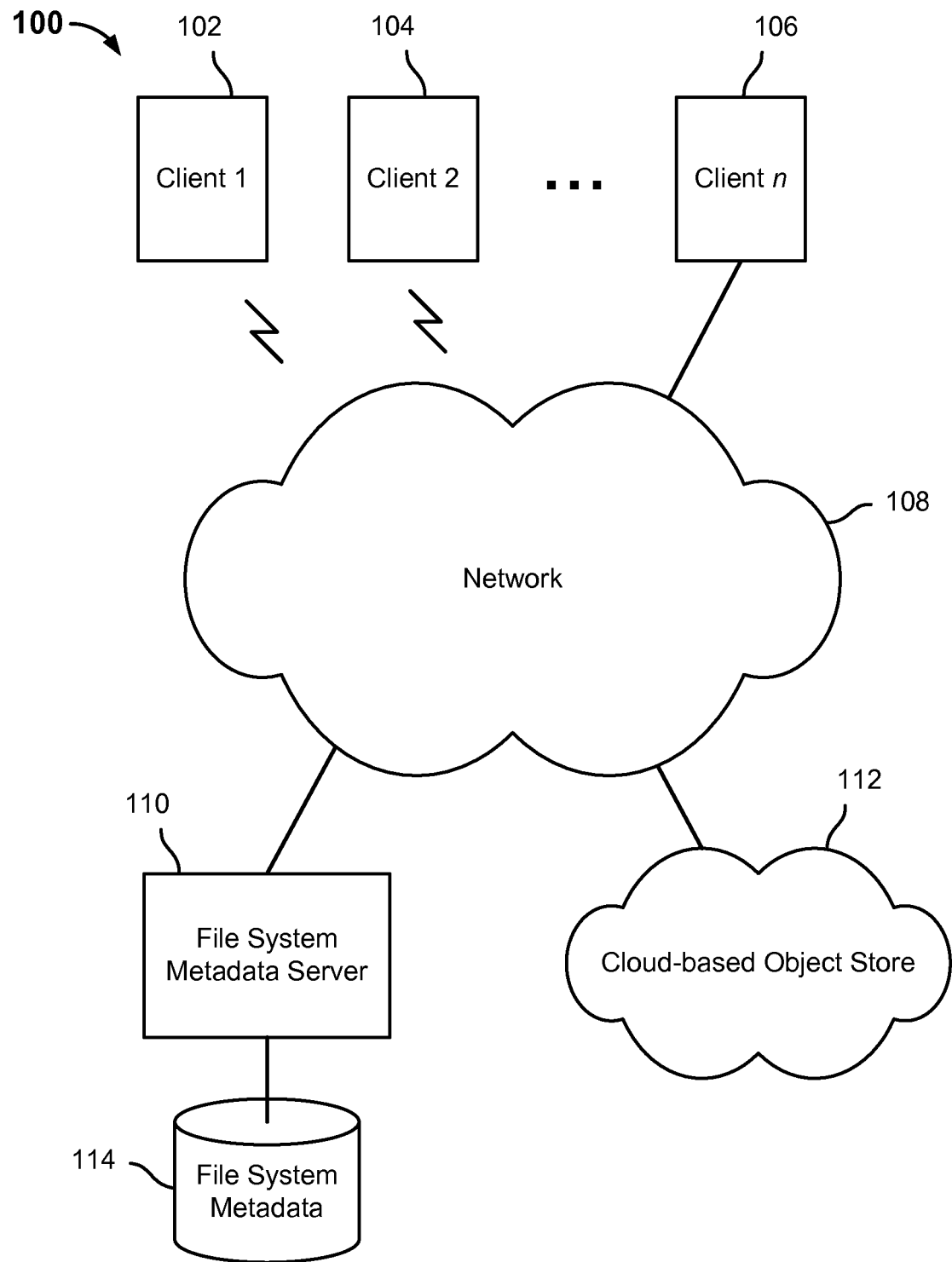
FIG. 1 is a block diagram illustrating an embodiment of a distributed file system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to provide disaster recovery of a file system metadata server as a service are disclosed. In various embodiments, a file system metadata server is backed up to cloud storage, e.g., to a cloud-based object store used by a distributed file system with which the file system metadata server is associated to store files, e.g., file segments or "chunks". In various embodiments, the file system metadata server backup comprises a self-describing encapsulation of information sufficient to create, using only the backup, a running "read only" instance of the file system metadata server that was backed up. In various embodiments, the backup may be retrieved by a disaster recovery service, e.g., in the event of loss of and/or loss of connectivity to the primary file system metadata server, and used to recover at a recovery target a "read only" instance of the file system metadata server. In some embodiments, the read only instance of the file system metadata server comprises a virtual appliance running in a virtual machine provided at the recovery target. In some embodiments, the read only instance of the file system metadata server is used in combination with an interposition layer that enables write operations to be performed by file system consumers (e.g., applications). In some embodiments, write operations may be stored in a local cache. If the primary file system metadata server becomes available and/or accessible again, the recovery service fails the recovered file system components back to the primary file system metadata server.

FIG. 1 is a block diagram illustrating an embodiment of a distributed file system and environment. In the example shown, the distributed file system environment 100 includes a plurality of client systems and/or devices, represented in FIG. 1 by clients 102, 104, and 106. In the example shown, the clients connect (wireless or otherwise) to a network 108, e.g., one or more of a local area network (LAN), a wide area network (WAN), the Internet, and/or one or more other public and/or private networks. The clients have access via network 108 to a file system metadata server 110. Applications on the respective clients, such as clients 102, 104, and 106, make file system calls, which result in various embodiments in corresponding remote calls being made to file system metadata server 110. For example, a file system client, agent, or other entity on the client may intercept or otherwise receive calls by the application to a local (e.g., native) file system, and may redirect such calls to an agent configured to make corresponding remote calls to file system metadata server 110 (e.g., transparently to the application).

In the example shown, data comprising objects stored in the file system, such as files, is stored in a cloud-based object store 112. In some embodiments, files may be segmented into a plurality of segments or "chunks", each of which is stored in a corresponding location in the cloud-based object store. File system calls are made to file system metadata server 110, which stores file system metadata in a file system metadata storage 114, e.g., in a database or other data store. File system metadata server 110 may store in file system metadata store 114, for example, a segment or "chunk" map for each file or other object stored and represented in the file system. For example, for each file name (e.g., pathname) the file system metadata server 110 may store in a corresponding segment map a hash or other representation of each segment, and for each a corresponding location in which the segment is (or is to be) stored in cloud-based object store 112. Other file system metadata, such as metadata typically stored by a file system, may be stored by file system metadata server 110 in file system metadata store 114. Examples include, without limitation, a directory, file, or other node/object name; an identification of parent and/or child nodes; a creation time; a user that created and/or owns the object; a time last modified and/or other time; an end-of-file (EOF) or other value indicative of object size; security attributes such as a classification, access control list, etc.; and/or other file system metadata.

While in the example shown in FIG. 1 the file system metadata server 110 and the cloud-based object store 112 are shown as separate systems, located in different networks and/or physical locations, in other embodiments the file system metadata and file system content data may be stored together, e.g., both on cloud-based resources and/or both on enterprise or other network servers, etc.

Figure 2:
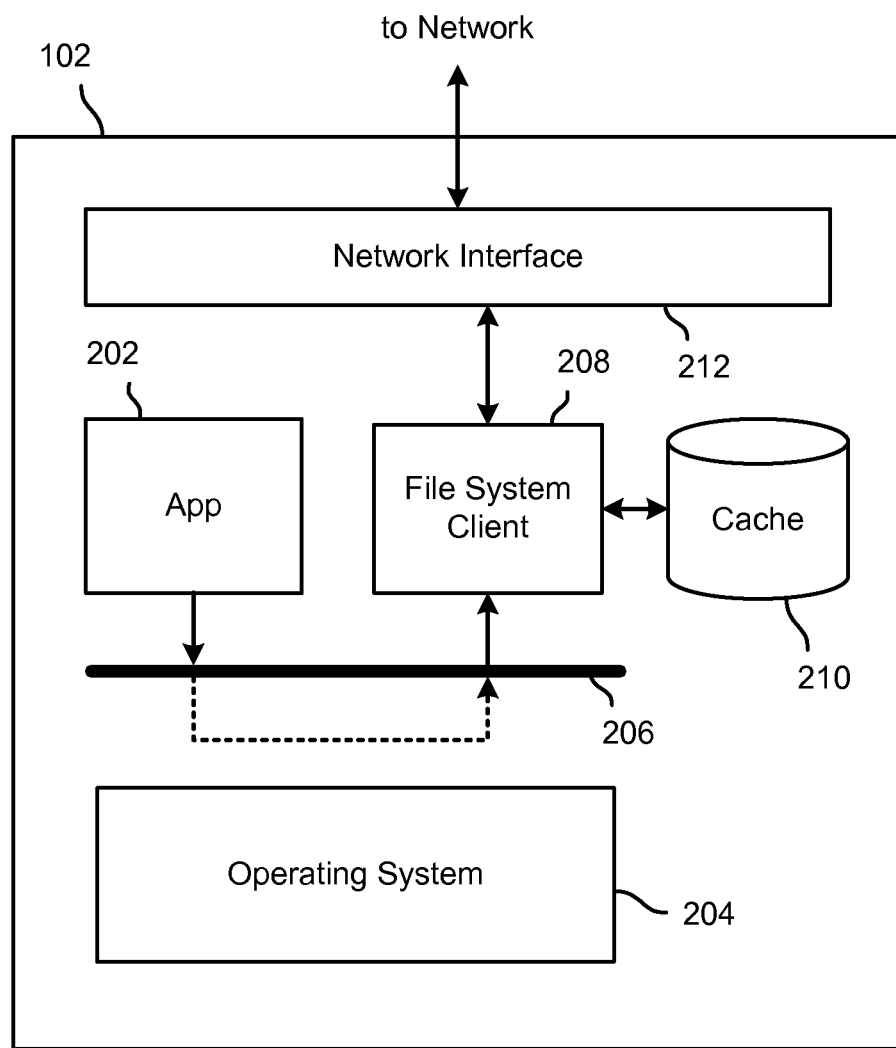
FIG. 2 is a block diagram illustrating an embodiment of a client system.

FIG. 2 is a block diagram illustrating an embodiment of a client system. In the example shown, the client system/device 102 of FIG. 1 is shown to include an application 202 running in an environment provided by an operating system 204. The operating system 204 includes a kernel (not shown) and other components configured to provide services and/or functionality to applications such as application 202. For example, operating system 204 may include and/or be configured to provide access to a native file system (not shown) of client system 102. Application 202 may be configured to make file system calls to the native file system, e.g., to store files or other objects created by/using application 202, to modify, move, or delete such objects, etc. In the example shown, file system calls made by application 202, represented in FIG. 2 by the downward pointing arrow originating in the block labeled "app" (202), are intercepted by a kernel module (or other component) 206 and redirected to a file system client (or other file system agent) 208. In some embodiments, file system agent 208 comprises a client application running in user space. In some embodiments, file system agent 208 comprises a kernel or other operating system component or module. File system client 208 in this example has associated therewith a local cache 210. In various embodiment, cache 210 may be used to buffer and/or otherwise stage file data prior to its being sent to remote storage (e.g., cloud-based object store 112 of FIG. 1), and/or to facilitate access to data stored previously but to which access may be requested later.

The client system 102 includes a network communication interface 212 that provides network connectivity, e.g., to a network such as network 108 of FIG. 1. For example, a request from app 202 to access a file stored remotely in various embodiments may result in file system client 208 making a remote call, via network communication interface 212, for example to a file system metadata server such as server 110 of FIG. 1.

In various embodiments, file system client 208 may be configured to store in a metadata write buffer comprising or otherwise associated with file system client 208 and/or cache 210 one or more file system operations and/or requests affecting file system metadata comprising a portion of the file system metadata with respect to which a file system metadata write lease is held by file system client 208. For example, file system operations affecting metadata may be buffered as received, e.g., as a result of local file system calls by applications such as application 202 of FIG. 2, and may be communicated to the remote file system metadata server asynchronously and/or upon occurrence of an event, e.g., receipt of an indication that a metadata write lease "break" event has been received and/or has occurred. For example, a second client system may indicate a desire and need to perform operations affecting a portion of the file system metadata with respect to which a first client system holds a lease, result in a "break" communication being sent to the first client system, which in turns "flushes" at least those operations in the buffer that affect the portion of metadata with respect to which the lease had been held.

Figure 3:
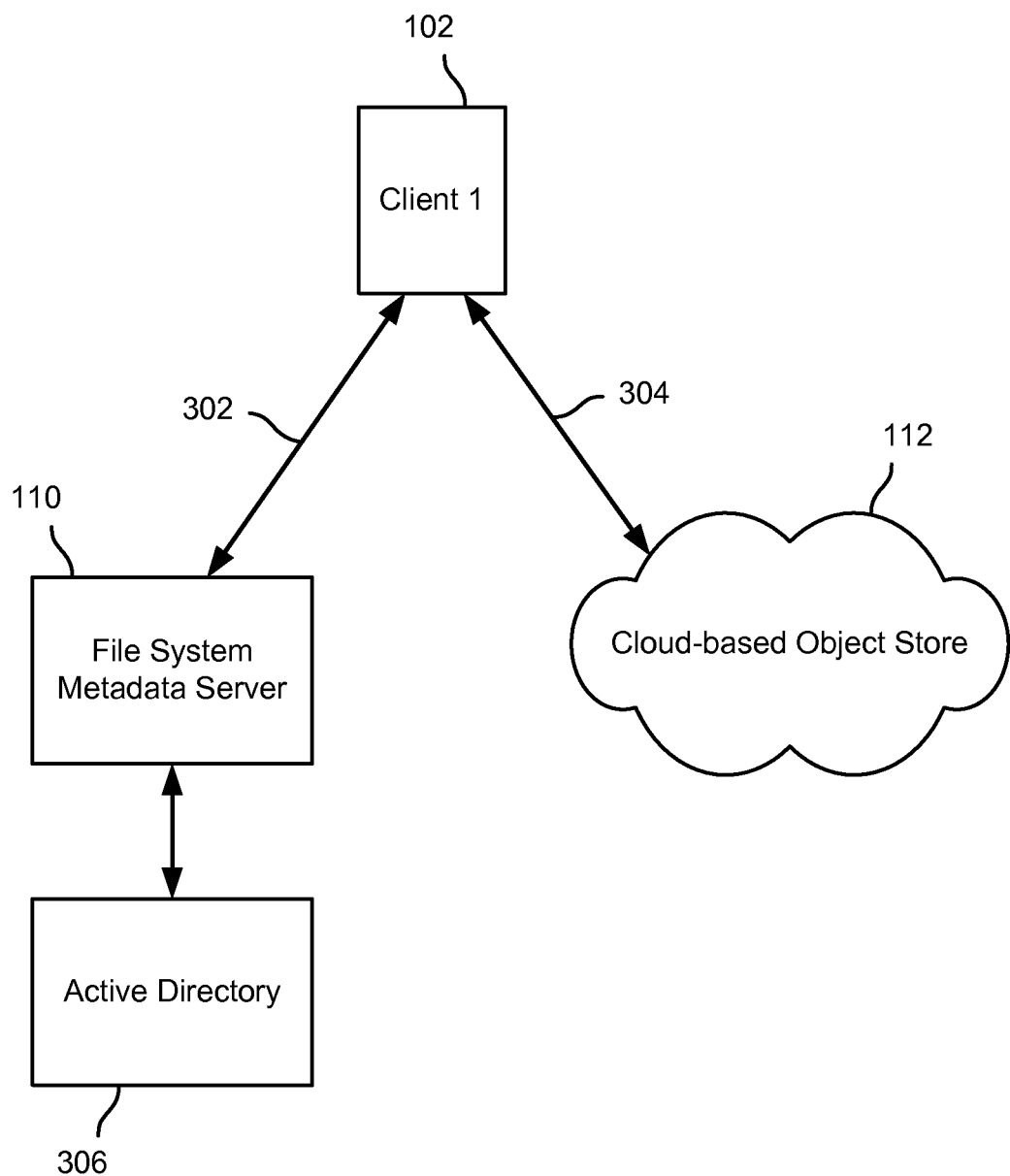
FIG. 3 is a block diagram illustrating an embodiment of a distributed file system.

FIG. 3 is a block diagram illustrating an embodiment of a distributed file system. In the example shown, client 102 communicates via a secure session-based connection 302 with file system metadata server 110. In addition, client 102 communicates with cloud-based object store 112 via a TCP/IP or other connection that enables client 102 to store objects (e.g., file segments or "chunks") via HTTP "PUT" requests and to retrieve segments ("chunks") via HTTP "GET" requests. In various embodiments, client 102 (e.g., a file system client or other agent running on client 102) sends and receives distributed file system "control plane" communications via secure connection 302 (e.g., file system operations that change or require the processing and/or use of file system metadata), whereas communicates sent via connection 304 may be considered to comprising a "data plane" via which file system object data (i.e., segments or "chunks") may be stored and/or retrieved. In the example shown, file system metadata server 110 has access to active directory 306, which in various embodiments may comprise information usable to authenticate users of clients such as client 102.

In various embodiments, file system objects, such as files, may be stored by a client on which a distribute file system client or other agent has been installed. Upon receiving a request to store (or modify) a file system object, in various embodiments the file system client segments the object into one or more segments or "chunks" and computes a reference (e.g., a hash) for each. The references are included in a file system request sent to the file system metadata server, e.g., via a secure connection such as connection 302 of FIG. 3. The file system metadata server returns information to be used by the file system client to store (non-duplicate) segments/chunks in the cloud-based object store by sending the segment data directly to the cloud-based object store, e.g., via PUT requests sent via a connection such as connection 304 of FIG. 3.

Figure 4:
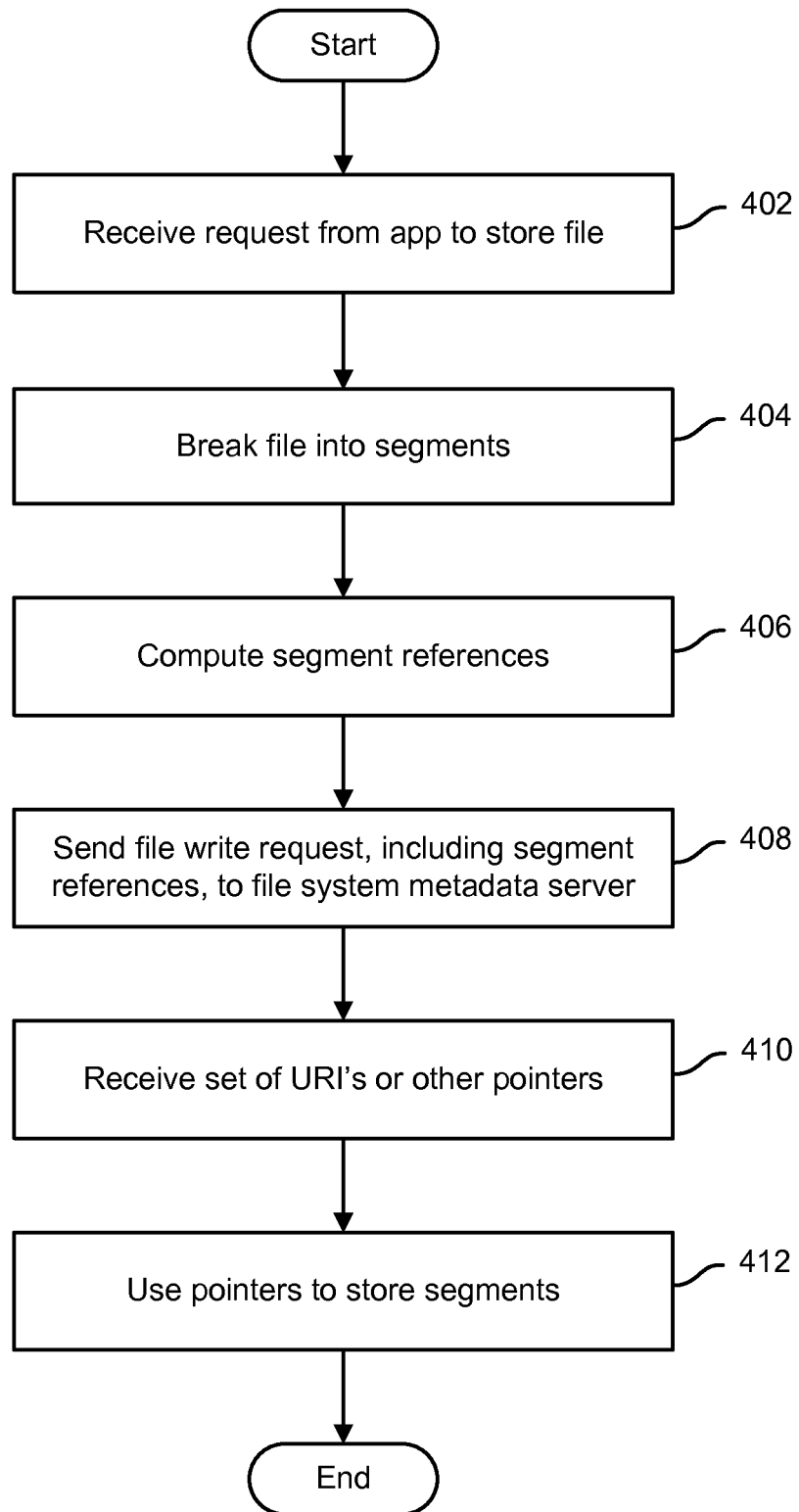
FIG. 4 is a flow chart illustrating an embodiment of a process to store a file or other file system object in a distributed file system.

FIG. 4 is a flow chart illustrating an embodiment of a process to store a file or other file system object in a distributed file system. In various embodiments, the process of FIG. 4 may be performed on a client system or device, e.g., by a file system client or other agent running on the client system/device, such as file system client 208 of FIG. 2. In the example shown, a request is received, e.g., from an application, to store a file (402). The file is segmented into one or more segments (404). For each segment, a segment reference, e.g., a hash, is computed (406). A file write request that includes the segment references is sent to the file system metadata server (408). A set of uniform resource indicators (URI's) or other pointers is received from the file system metadata server (410). In various embodiments, the set of pointers may include pointers only for those segments not already stored by the distributed file system. The received pointers are used to store segments, e.g., via HTTP "PUT" requests sent directly to the cloud-based object store (412).

Figure 5:
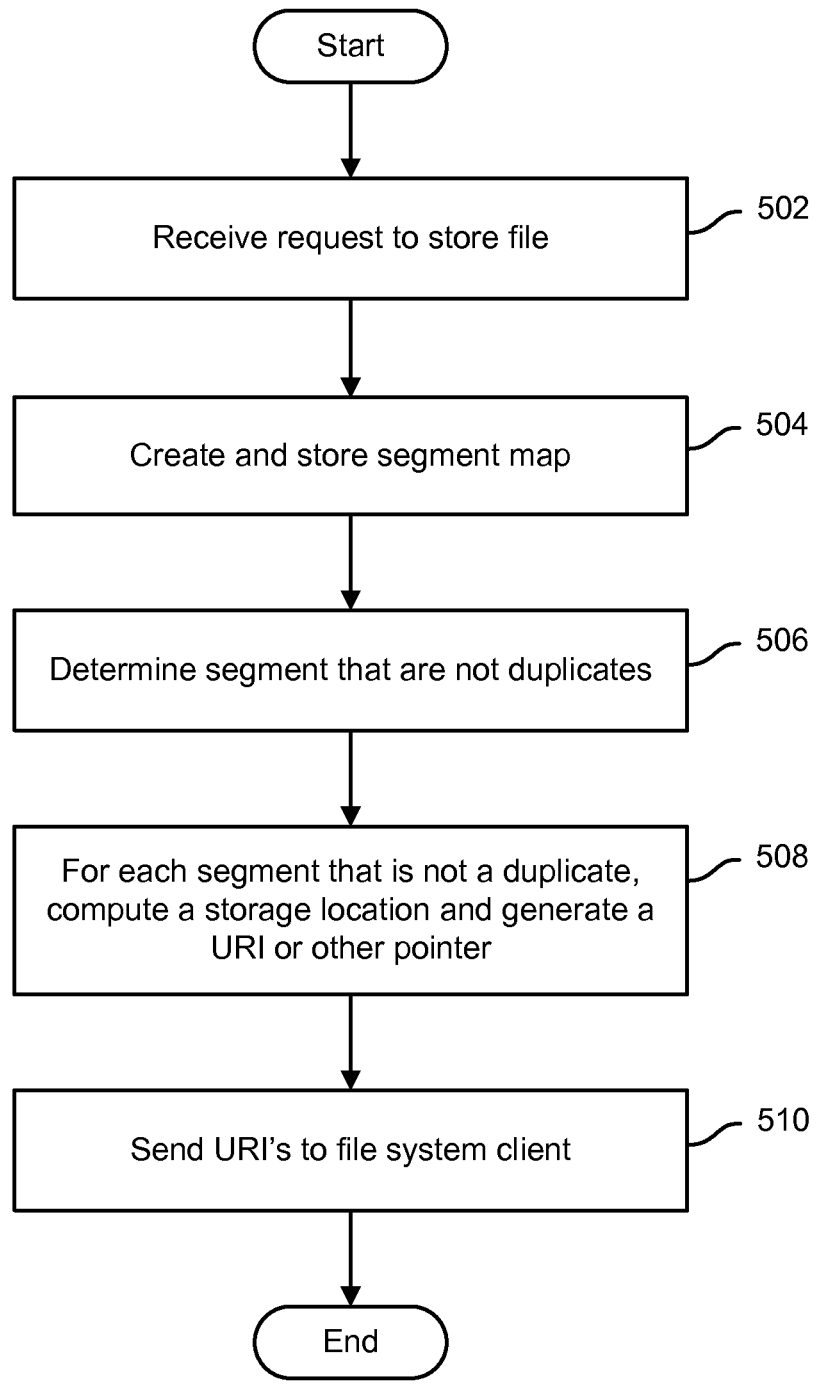
FIG. 5 is a flow chart illustrating an embodiment of a process to handle a request to store a file or other file system object in a distributed file system.

FIG. 5 is a flow chart illustrating an embodiment of a process to handle a request to store a file or other file system object in a distributed file system. In various embodiments, the process of FIG. 5 may be performed by a file system metadata server, such as file system metadata server 110 of FIG. 1. In the example shown, a request to store a file is received (502). A segment ("chunk") map that associates the file system object name and/or other identifier (e.g., file name, pathname) with a set of one or more segment references (e.g., hash values) is created (504). Segments that are not duplicates of segments already stored by the distributed file system are identified, for example based on the segment references (506). For each segment that is not a duplicate, a storage location is computed (e.g., based at least in part on all or part of the segment reference) and a URI or other pointer usable to store the segment directly in the cloud-based data store is generated (508). In various embodiments, the URI or other pointer is signed cryptographically by the file system metadata server. The URI may have an expiration time by which it must be used to store the segment. The URI's are sent to the file system client from which the request to store the file was received (510).

Figure 6:
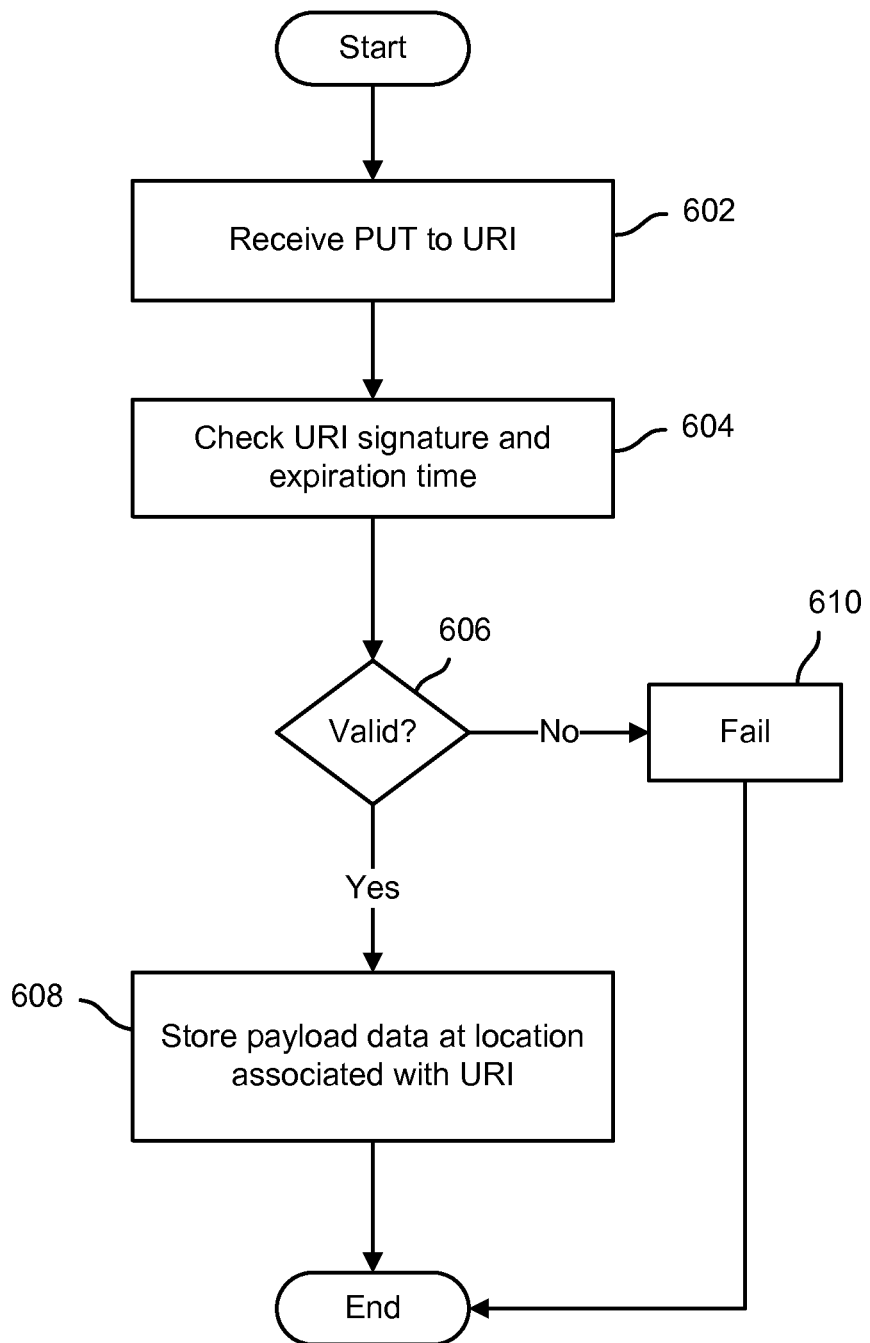
FIG. 6 is a flow chart illustrating an embodiment of a process to store file segment or "chunk" data associated with a distributed file system.

FIG. 6 is a flow chart illustrating an embodiment of a process to store file segment or "chunk" data associated with a distributed file system. In various embodiments, the process of FIG. 6 may be performed by a cloud-based object store, such as object store 112 of FIG. 1. In the example shown, a "PUT" request associated with a URI specified in the request is received (602). A cryptographic signature associated with the URI and an expiration time encoded in the URI are checked (604). For example, the cloud-based object store may be provisioned to check that the URI has been signed by a trusted file system metadata server and/or that an expiration time of the URI has not elapsed. If the URI is determined to be currently valid (606), a payload data associated with the PUT request, e.g., file system object segment or "chunk" data, is stored in a location associated with the URI (608). If the URI is determined to not be valid (606), the PUT request fails (610), and the file system client receives a response indicating it must obtain a new URI from the file system metadata server.

In various embodiments, file system objects, such as files, may be retrieved by a client on which a distribute file system client or other agent has been installed. Upon receiving a request to access a file system object, in various embodiments the file system client sends a file access request to the file system metadata server, e.g., via a secure connection such as connection 302 of FIG. 3. The file system metadata server returns information (e.g., one or more URI's or other pointers) to be used by the file system client to retrieve segments/chunks directly from the cloud-based object store, e.g., via GET requests sent via a connection such as connection 304 of FIG. 3.

Figure 7:
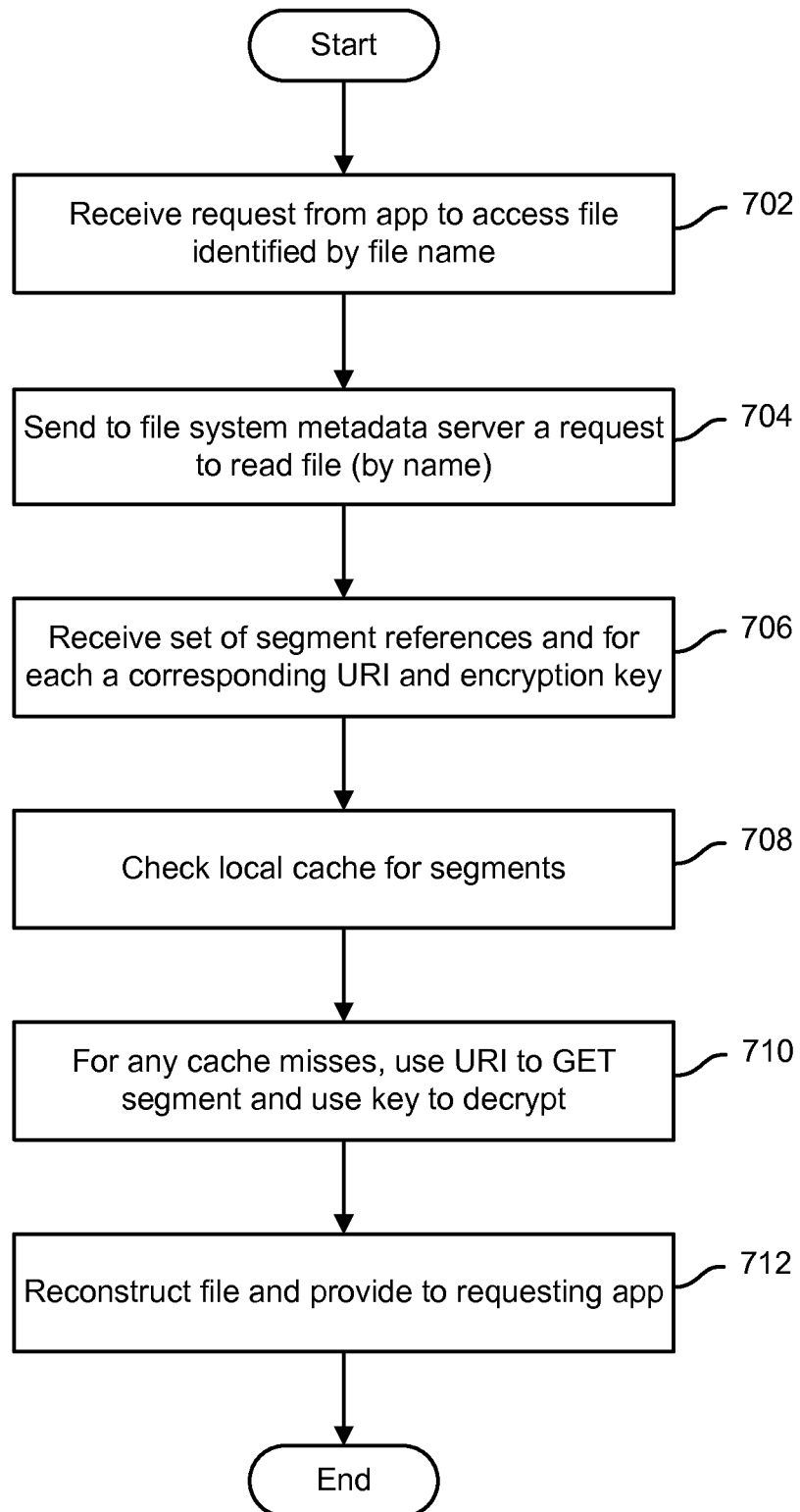
FIG. 7 is a flow chart illustrating an embodiment of a process to access a file or other file system object stored in a distributed file system.

FIG. 7 is a flow chart illustrating an embodiment of a process to access a file or other file system object stored in a distributed file system. In various embodiments, the process of FIG. 4 may be performed on a client system or device, e.g., by a file system client or other agent running on the client system/device, such as file system client 208 of FIG. 2. In the example shown, a request to access a file system object, e.g. a file identified by file name, is received from an application (702). A request is sent to a file system metadata server to retrieve the file (704). A set of segment references, and for each a corresponding URI and encryption key, is received from the file system metadata server (706). A local cache is checked to determine whether any required segments are present in the cache (708). For all segments not present in the cache, the associated URI is used to send a GET request to retrieve the segment from the cloud-based object store, and the associated key is used to decrypt the segment once it has been received from the object store in encrypted form (710). The segments are used to reconstruct the file and provide access to the file to the application from which the access request was received (712).

Figure 8:
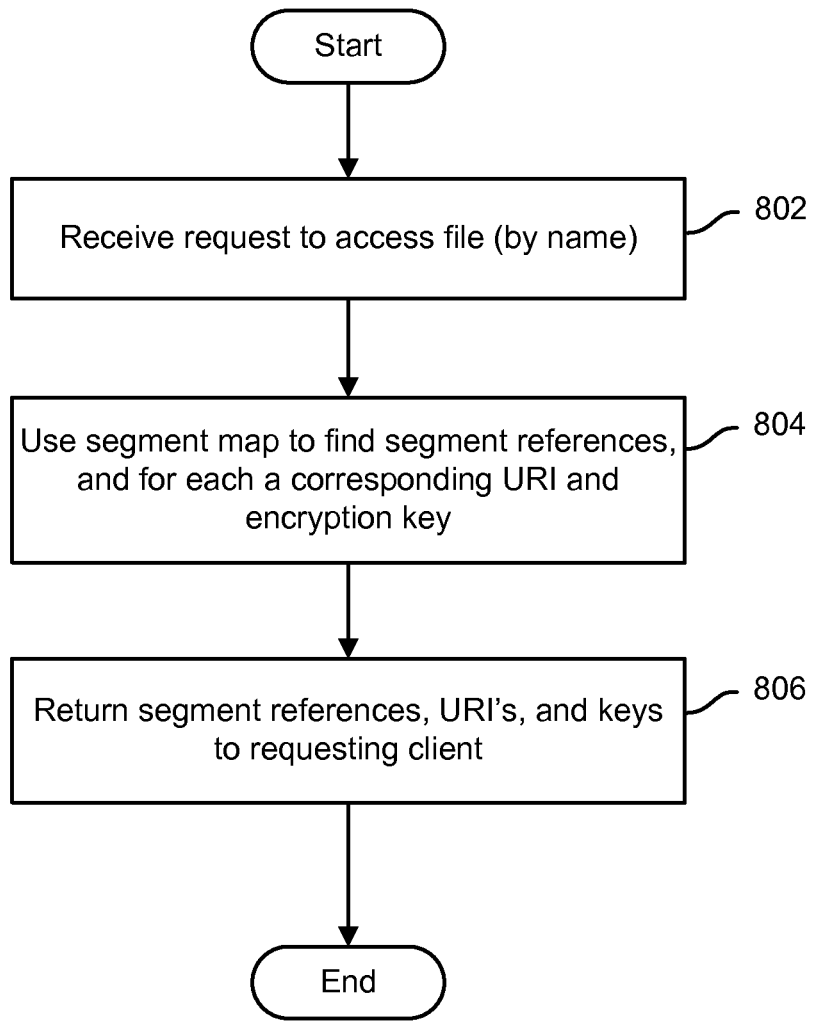
FIG. 8 is a flow chart illustrating an embodiment of a process to handle a request to access a file or other file system object stored in a distributed file system.

FIG. 8 is a flow chart illustrating an embodiment of a process to handle a request to access a file or other file system object stored in a distributed file system. In various embodiments, the process of FIG. 5 may be performed by a file system metadata server, such as file system metadata server 110 of FIG. 1. In the example shown, a request to access a named file is received (802). A segment map associated with the file is retrieved and used to determine a set of segment references (e.g., hashes), and for each a corresponding URI indicating where the segment is stored in the cloud-based segment store and an encryption key usable to decrypt the segment (804). The segment references, URI's, and keys are returned to the file system client from which the file access request was received (806).

Providing disaster recovery of a file system metadata server as a service is disclosed.

Figure 9:
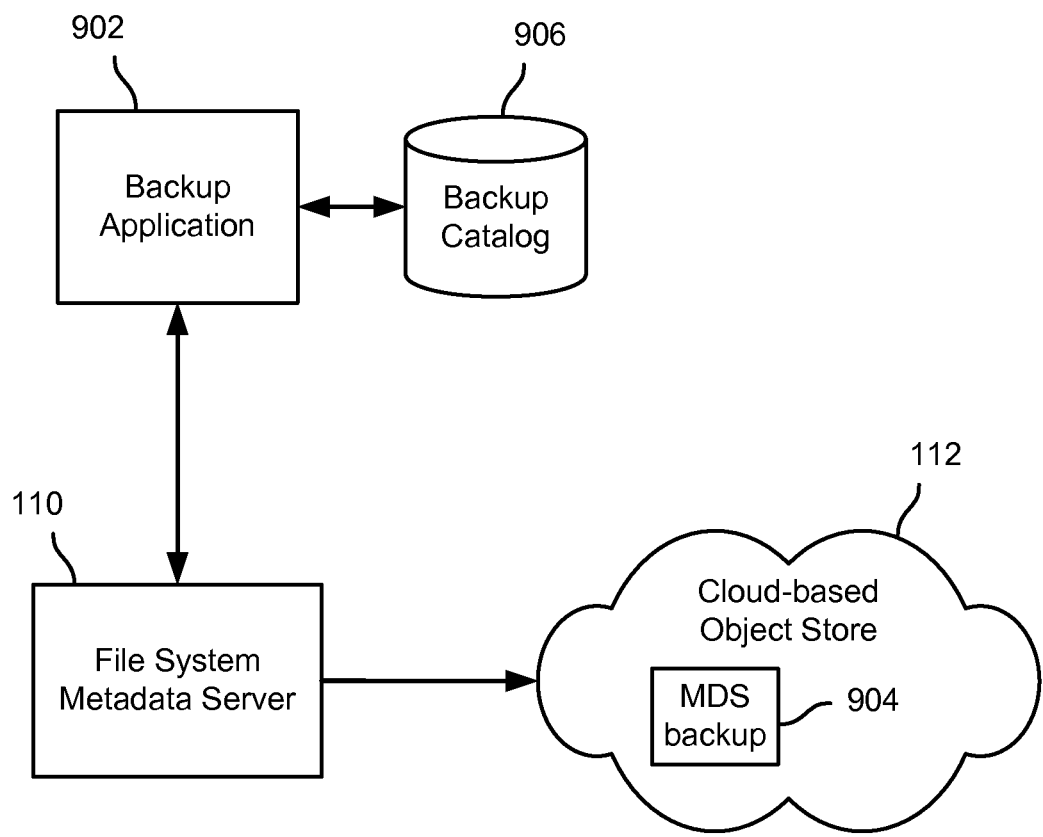
FIG. 9 is a block diagram illustrating an embodiment of a distributed file system configured to be backed up to cloud storage.

FIG. 9 is a block diagram illustrating an embodiment of a distributed file system configured to be backed up to cloud storage. In the example shown, a backup application 902 interacts with file system metadata server 110 to cause a backup 904 of file metadata server (MDS) to be created and stored in cloud-based object store 112. Information about the backup is stored in a backup catalog 906. In various embodiments, backup 904 includes a complete description of the file system metadata server 110 and its state at the time the backup was created, i.e., the backup 904 is sufficient on its own to be used to recover the file system metadata server 110 in the state in which it was at the time the backup was created. In various embodiments, information about the backup that is stored in backup catalog 906 includes information sufficient to locate the backup 904 in cloud storage, without requiring any further action by and/or information from the file system metadata server 110.

Figure 10:
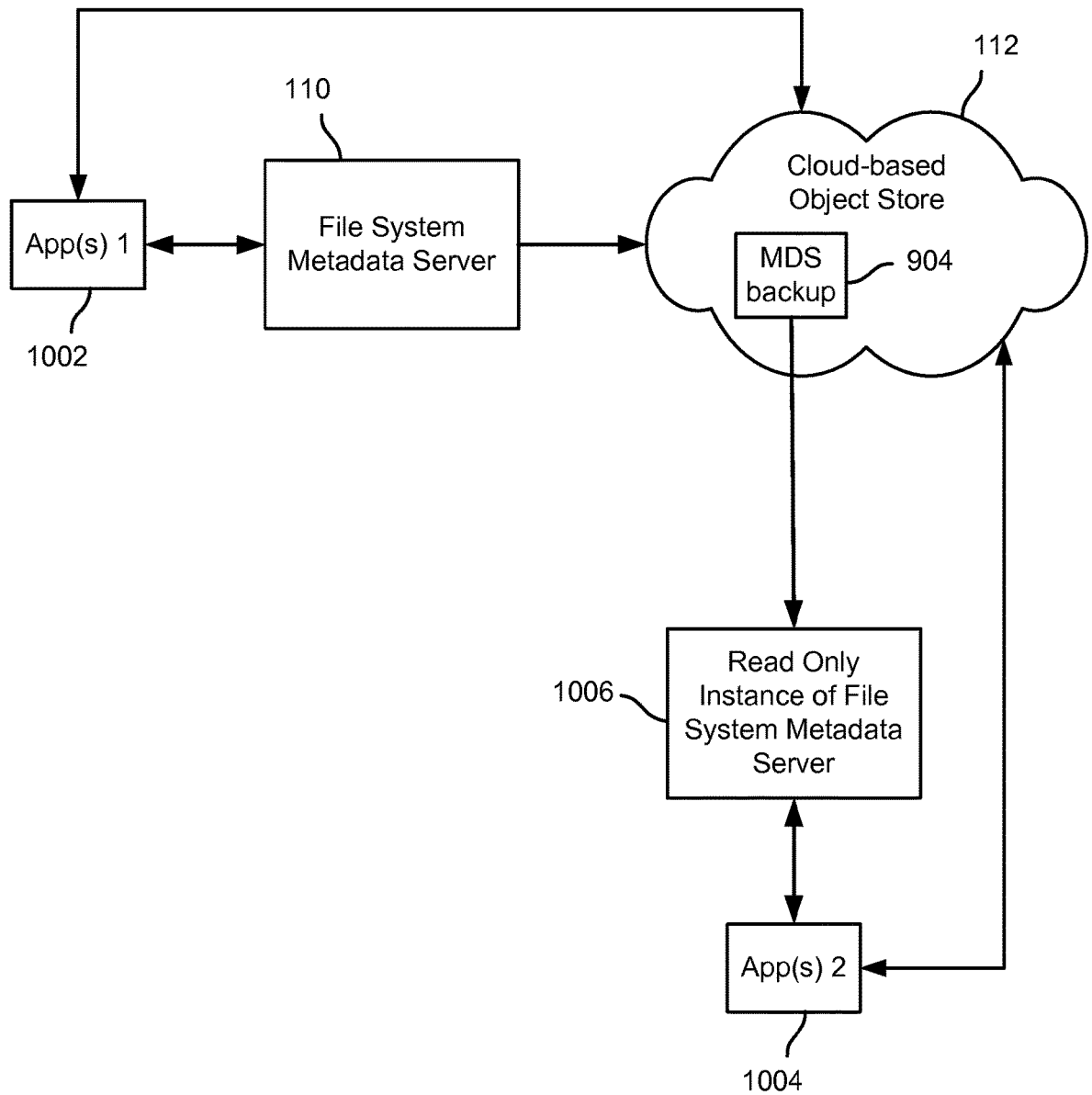
FIG. 10 is a block diagram illustrating an embodiment of a distributed file system configured to restore a read only instance of a file system metadata server as backed up to cloud storage.

FIG. 10 is a block diagram illustrating an embodiment of a distributed file system configured to restore a read only instance of a file system metadata server as backed up to cloud storage. In the example shown, file system metadata server 110 has been backed up by creating and storing in cloud-based object store 112 the backup file/image/other object 904. In this example, the "primary" file system metadata server 110, e.g., a physical or virtual appliance running in an enterprise network, remains accessible to application instance(s) 1002, comprising for example application instances running on client system that are on a same enterprise wide area network (WAN) or other network as client systems on which application instance(s) 1002 is/are running. The application instance(s) 1002 continue to interact with primary file system metadata server 110 normally, communicating with the primary file system metadata server 110 to perform file system metadata related operations and communicating directly with the cloud-based object store 112, using locators and/or other information received from primary file system metadata server 110, to store and/or retrieve file segments or other file data.

In the example shown in FIG. 10, a second set of one or more application instances 1004 has lost access to primary file system metadata server 110. For example, an intervening network or node through which connectivity to primary file system metadata server 110 had previously been made available to application instance(s) 1004 may have experienced a temporary or permanent failure, resulting in a loss of connectivity. In various embodiments, in response to a call to a cloud-based disaster recovery service having been made, e.g., by application instance(s) 1004 and/or another entity acting on their behalf, a read only instance 1006 of the file system metadata server 110 has been instantiated on a host associated with the disaster recovery service. In this example, the read only instance 1006 of file system metadata server 110 is created at least in part by locating and retrieving file system metadata server backup 904 from cloud-based object store 112. For example, the disaster recovery service may have used an identifier associated with file system metadata server 110, e.g., one included in a call to the disaster recovery service made by or on behalf of application instance(s) 1004, to locate the backup 904, such as by using the file system metadata server identifier to locate associated backup meta-information in a backup catalog such as catalog 906 of FIG. 9.

In various embodiments, the self-describing backup 904 is sufficient to create the read only instance 1006 and initialize the read only instance 1006 to a state in which the file system metadata server 110 was at a time when the backup 904 was created. In some embodiments, the read only instance 1006 may comprises a virtual appliance running in a virtual machine running on a host associated with the disaster recovery service.

In the example shown, read only instance 1006 is configured to provide read only access to file system metadata through direct communication between application instance(s) 1004 and the read only instance 1006, and to facilitate at least read only access to files or other objects (e.g., file segments) stored in cloud-based object store 112. In some embodiments, application instance(s) are able to perform write operations, which are cached locally until they can be merged back into the file system metadata as maintained by the primary file system metadata server 110, e.g., once that server and/or connectivity thereto has/have been restored.

Figure 11:
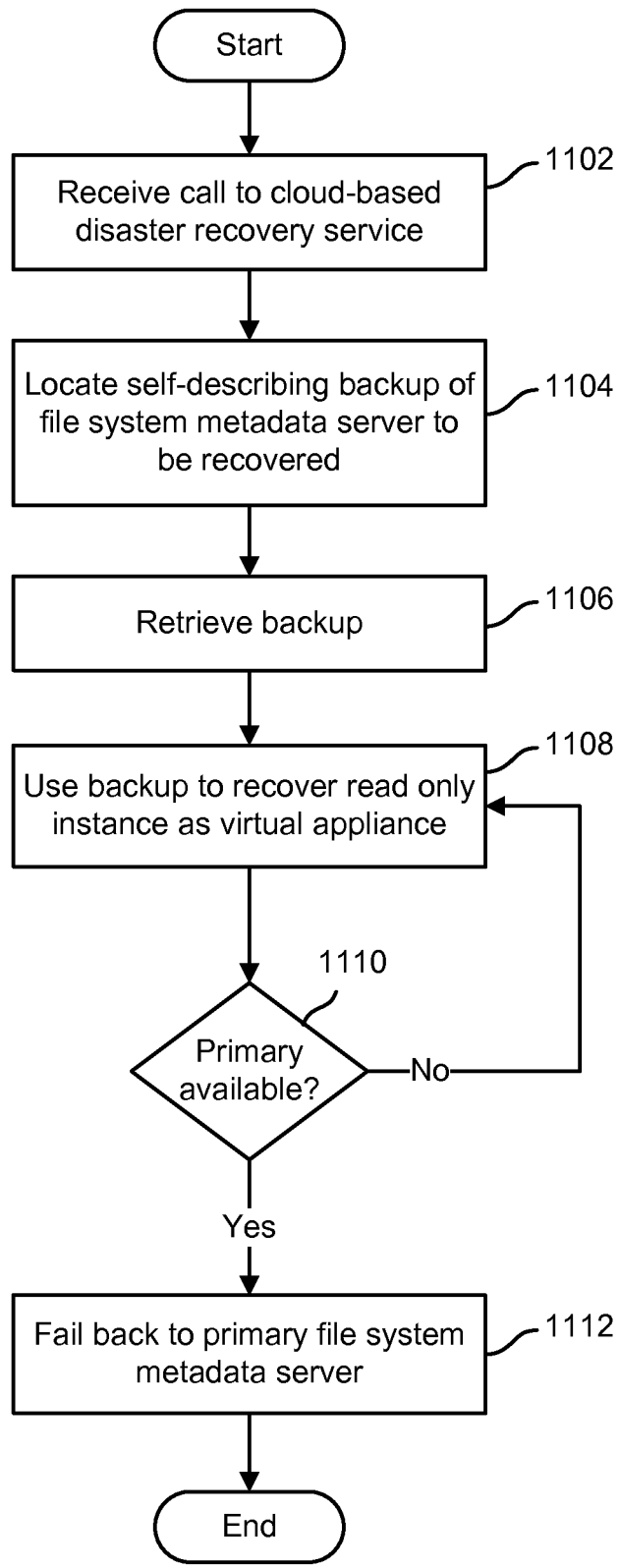
FIG. 11 is a flow chart illustrating an embodiment of a process to recover a read only instance of a file system metadata server as backed up to cloud storage.

FIG. 11 is a flow chart illustrating an embodiment of a process to recover a read only instance of a file system metadata server as backed up to cloud storage. In various embodiments, the process of FIG. 11 may be performed by a disaster recovery service. In the example shown, a call to a cloud-based disaster recover service is received (1102). The call may include a request to recover a file system metadata server specified in the request. A self-describing backup of the file system metadata server to be recovered is located (1104). For example, a backup catalog or other information store may be accessed, directly or indirectly, to locate the backup. The location information is used to retrieve the backup, e.g., from a cloud-based or other object store in which it is stored (1106). The backup is used to recover a read only instance of the file system metadata server, e.g., as a virtual appliance running in a virtual machine provided on a physical host associated with the disaster recover service (1108). If the primary instance of the file system metadata server becomes available again (1110), the disaster recover service fails the read only instance of the file system metadata server back to the primary file system metadata server (1112). While the primary file system metadata server remains unavailable (1110), the read only instance created using the retrieved backup continues to be used to provide at least read only access to the file system and associated file system metadata, files, or other objects or data.

Figure 12:
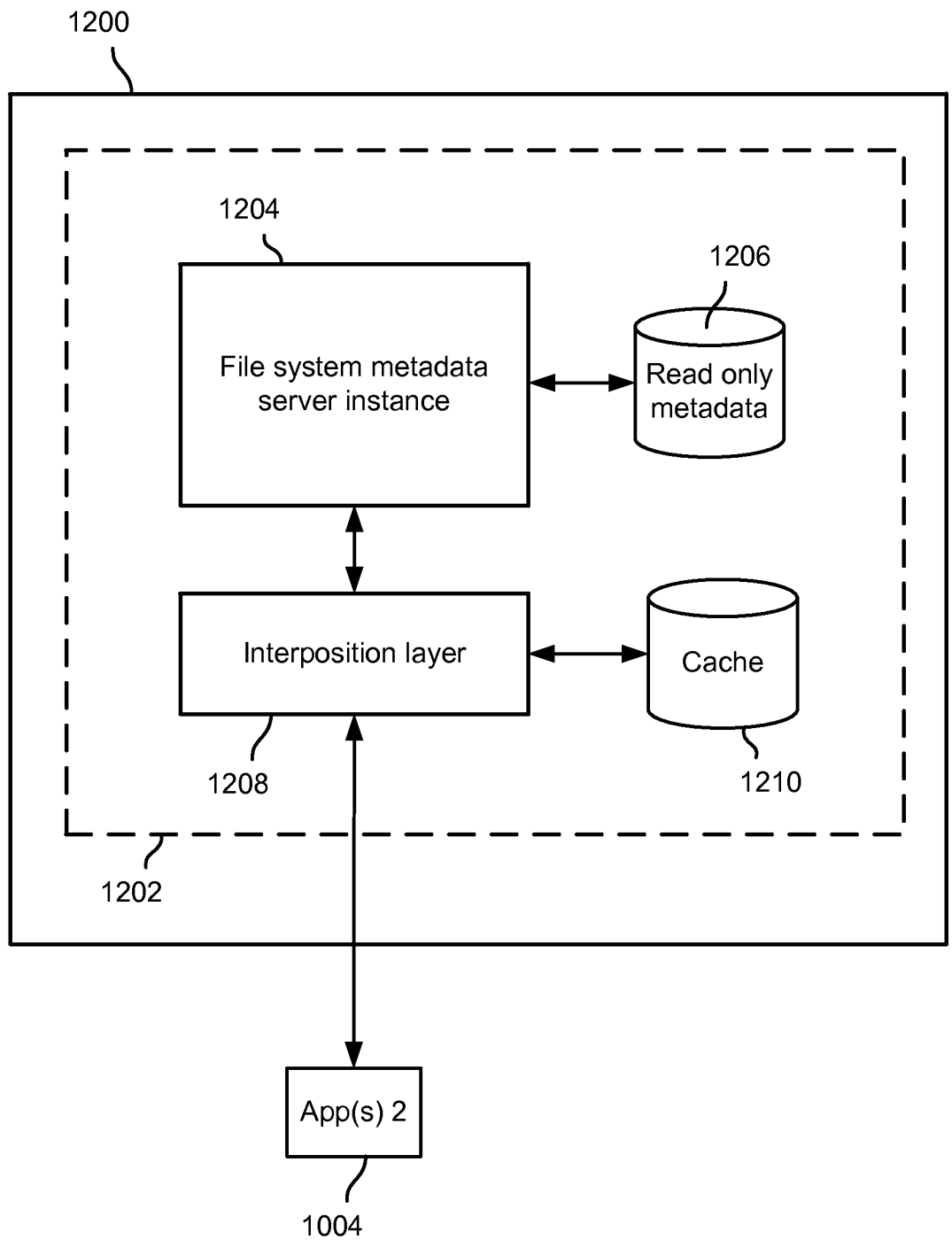
FIG. 12 is a block diagram illustrating an embodiment of a system to provide read only instance of a file system metadata server.

FIG. 12 is a block diagram illustrating an embodiment of a system to provide read only instance of a file system metadata server. In various embodiments, the system of FIG. 12 may be used to provide a read only instance of a file system metadata server, such as read only instance 1006 of FIG. 10. In the example shown, host computer system 1200, e.g., a server or other host associated with a disaster recovery service, has a virtual machine 1202 running on it. The virtual machine 1202 is used to create and run a read only instance 1204 of a file system metadata server, e.g., as a virtual appliance running in virtual machine 1202. As described above, in some embodiments the read only instance may be provided by locating and retrieving a remotely stored backup of the file system metadata server. In the example shown, the read only file system metadata server instance 1204 has associated therewith a read only copy of file system metadata 1206. In some embodiments, file system metadata 1206 may be included in the same backup used to instantiate the read only file system metadata server instance 1204.

In the example shown in FIG. 12, an interposition layer 1208 is included. In the example shown, interposition layer 1208 receives file system calls from application instance(s) 1004, in this example. Interposition layer 1208 is operable to pass through to file system metadata server instance 1204 file system requests associated with reading file system metadata that was included in the backup used to instantiate file system metadata server instance 1204. Interposition layer 1208 is configured to write to a local cache 1210 any file system operations associated with writing new file system metadata (e.g., storing a file, storing data associated with modifications to a file, updating file system metadata attributes, such as owner, time, end of file, etc.). In various embodiments, interposition layer 1208 keeps track of metadata written to local cache 1210, and accesses data written previously to cache 1210 as needed to respond to requests to perform file system operations associated file system data that has been written to cache 1210. For example, if an updated value for a file system metadata attribute is stored in cache 1210 and a later operation is received that requires the attribute to be read, the interposition layer 1208 may be configured to read the value from cache 1210 and to use that value to perform the requested operation.

Figure 13:
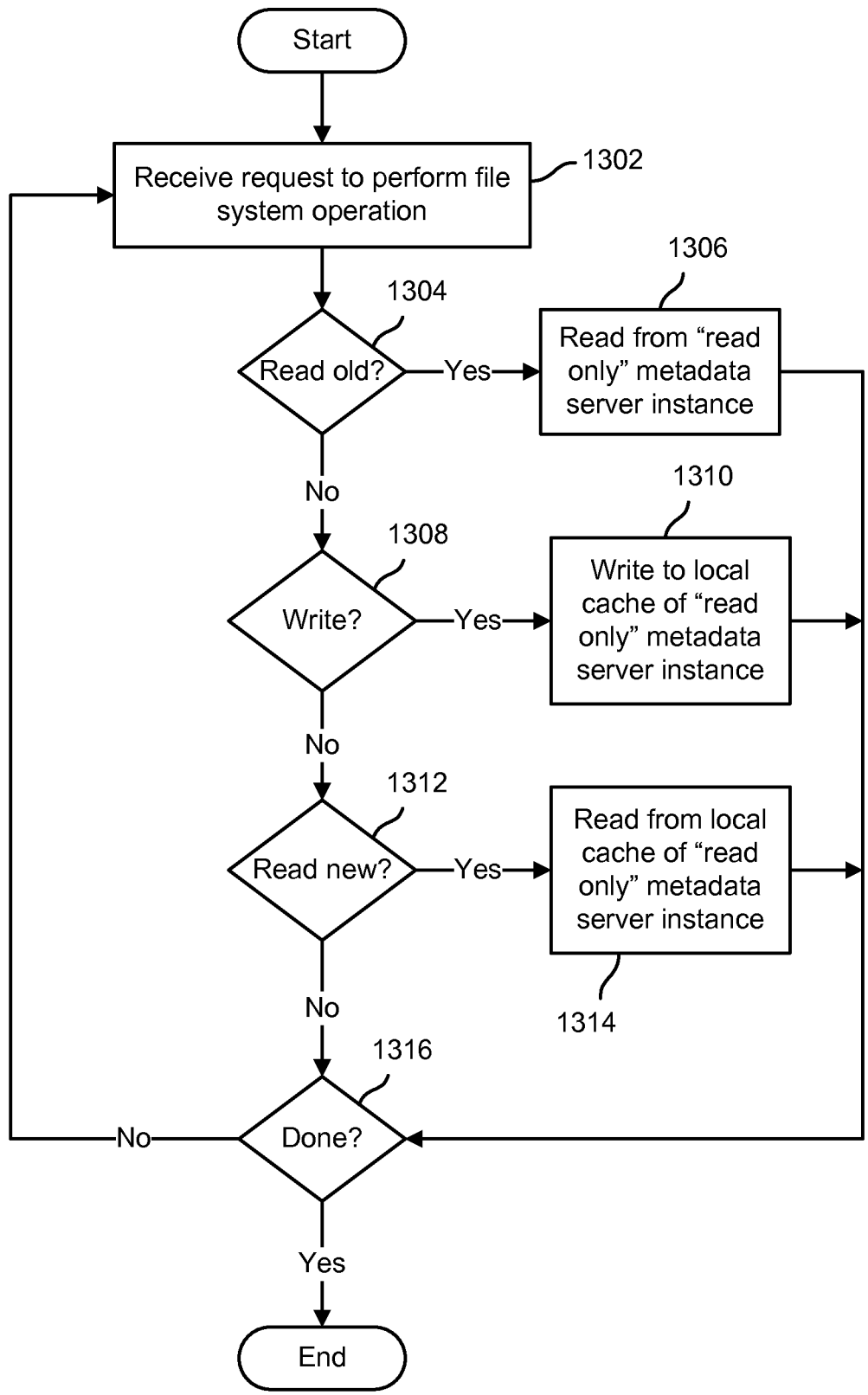
FIG. 13 is a flow chart illustrating an embodiment of a process to provide a disaster recovery service using a read only instance of a file system metadata server as backed up to cloud storage.

FIG. 13 is a flow chart illustrating an embodiment of a process to provide a disaster recovery service using a read only instance of a file system metadata server as backed up to cloud storage. In various embodiments, the process of FIG. 13 may be performed by an interposition layer, such as interposition layer 1208 of FIG. 12. In the example shown, a request to perform a file system operation is received (1302). If the request is associated with reading file system metadata that existed when a backup used to recover a read only instance of a file system metadata server was create (1304), the request is processed by invoking the read only instance to read the metadata from a read only copy of file system metadata, such as read only metadata 1206 of FIG. 12 (1306). If the request is associated with writing new or modified file system metadata (1308), the new or modified metadata value(s) is/are written to a local cache, such as cache 1210 of FIG. 12 (1310). Finally, if the request is associated with reading file system metadata store previously in the local cache (1312), the metadata is read from the local cache and used to perform and/or otherwise responds to the request (1314). The process of FIG. 13 continues until it is no longer required (1316), e.g., the recovered instance of the file system metadata server has been failed back to the primary file system metadata server.

In various embodiments, failing back to a primary file system metadata server an instance of a file system metadata server that has been recovered by a disaster recover service as disclosed herein includes merging back into file system metadata of the file system updates that have been written to a local cache such as cache 1210 of FIG. 12. In various embodiments, conflicts between file system metadata as stored by the primary file system metadata server and corresponding metadata as stored in a local cache of a recovered read only instance of the file system metadata server, such as cache 1210 of FIG. 12, are resolve by applying conflict resolution and/or priority rules and/or by generating notifications to prompt human intervention to resolve conflicts.

Figure 14:
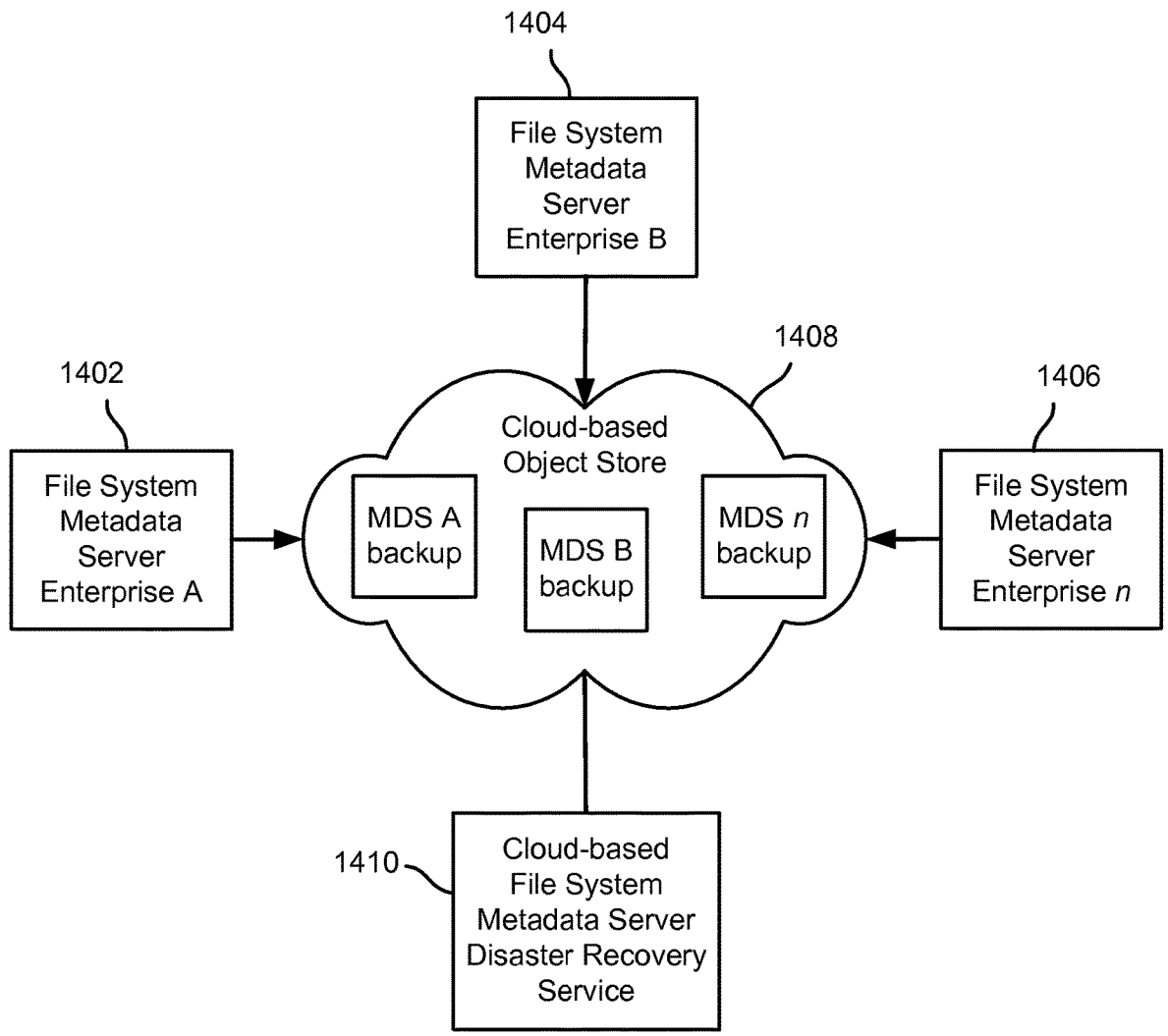
FIG. 14 is a block diagram illustrating an embodiment of a cloud-based file system metadata server disaster recovery service.

FIG. 14 is a block diagram illustrating an embodiment of a cloud-based file system metadata server disaster recovery service. In the example shown, multiple file system metadata servers, represented in FIG. 14 by file system metadata servers 1402, 1404, and 1406, are backed up by storing an associated backup file or other object in cloud-based object store 1408. In this example, each of the file system metadata servers 1402, 1404, and 1406 is associated with a different enterprise. However, since each stores its backup in cloud-based object store 1408, in this example users of the respective distributed file systems associated with file system metadata servers 1402, 1404, and 1406 has access to a cloud-based file system metadata server disaster recovery service 1410. For example, users of any one (or more) of the file system metadata servers 1402, 1404, and 1406 who encounter a loss of availability of its corresponding file system metadata server may invoke file system metadata server disaster recovery service 1410 to request that the file system metadata server be recovered by the service, using the corresponding backup stored in cloud-based object store 1408, and made available to the requesting user, as in the example shown in FIG. 10.

In various embodiments, techniques disclosed herein may be used to provide disaster recovery of file system metadata servers as a service, eliminating the need for owners/operators of such servers to maintain their own disaster recovery infrastructure and capability.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, by one or more processors, an indication to provide alternative access to a file system metadata server that provides file system metadata if a primary instance of the file system metadata server for the file system metadata has failed;
obtaining, by one or more processors, a copy of a self-describing backup of the file system metadata server from a backup catalog, wherein the self-describing backup of the file system metadata server comprises information sufficient to create a read only instance of the file system metadata server, and to initialize the read only instance of the file system metadata server; and
using, by one or more processors, the backup to provide access to a read only instance of the file system metadata server, wherein:
one or more write operations that are received from one or more nodes are intercepted by an interposition layer and locally cached until the primary instance of the file system metadata server is restored,
the one or more operations being with respect to the file system metadata provided by the file system metadata server, and
in response to a subsequent operation being received and a determination that the subsequent operation is with respect to data associated with the one or more write operations, using at least a value stored in a local cache corresponding to at least one of the one or more write operations that are cached.

2. The method of claim 1, wherein the indication comprises a call to a disaster recovery service.

3. The method of claim 1, wherein obtaining said copy of said self-describing backup of the file system metadata server includes retrieving the copy from a cloud-based storage associated with the file system metadata server.

4. The method of claim 1, wherein obtaining said copy of said self-describing backup of the file system metadata server includes accessing the backup catalog to locate the backup.

5. The method of claim 1, wherein the backup is used to provide access to a read only instance of the file system metadata server at least in part by using the backup to instantiate an instance of the file system metadata server running in a virtual machine.

6. The method of claim 5, wherein the instance comprises a virtual appliance.

7. The method of claim 1, wherein the read only instance includes a read only copy of the file system metadata.

8. The method of claim 7, wherein the read only copy of file system metadata is included in the backup.

9. The method of claim 1, wherein caching the write operations with respect to the file system metadata comprises storing file system metadata associated with write operations in the local cache associated with the read only instance of the file system metadata server.

10. The method of claim 9, further comprising keeping track of file system metadata that has been written to the local cache, and reading from the local cache metadata that has been written to the cache as required to respond to subsequent file system operations requiring that such metadata be read.

11. The method of claim 9, further comprising failing the read only instance of the file system metadata server back to the primary instance of the file system metadata server.

12. The method of claim 11, wherein failing back includes merging metadata that has been written to the local cache back into a primary file system metadata maintained by the primary instance of the file system metadata server.

13. The method of claim 1, further comprising:
receiving a read operation with respect to the file system metadata; and
providing a result corresponding to the read operation, the result being based at least in part on information pertaining to the one or more write operations that are cached until the primary instance of the file system metadata is restored.

14. The method of claim 13, wherein the result to the read operation is generated based at least in part on using at least one of the one or more write operations that are cached until the primary instance of the file system metadata is restored.

15. The method of claim 1, wherein the one or more write operations with respect to the file system metadata that are cached correspond to one or more operations associated with writing new or modified file system metadata.

16. The method of claim 1, wherein the interposition layer maintains information pertaining to metadata written to the local cache and accesses the information pertaining to metadata written to a local cache in response to a request to perform one or more file system operations associated with the metadata written to the local cache.

17. The method of claim 1, wherein the information comprised in the local cache can be subject to the one or more write operations while the primary instance of the file system metadata server is being restored.

18. A system, comprising:
a communication interface; and
a processor coupled to the communication interface and configured to:
receive via the communication interface an indication to provide alternative access to a file system metadata server that provides file system metadata if a primary instance of the file system metadata server for the file system metadata has failed;
obtain a copy of a self-describing backup of the file system metadata server from a backup catalog, wherein the self-describing backup of the file system metadata server comprises information sufficient to create a read only instance of the file system metadata server, and to initialize the read only instance of the file system metadata server; and
use the backup to provide access to a read only instance of the file system metadata server, wherein:
one or more write operations that are received from one or more nodes are intercepted by an interposition layer and locally cached until the primary instance of the file system metadata server is restored,
the one or more operations being with respect to the file system metadata provided by the file system metadata server, and
in response to a subsequent operation being received and a determination that the subsequent operation is with respect to data associated with the one or more write operations, using at least a value stored in a local cache corresponding to at least one of the one or more write operations that are cached.

19. The system of claim 18, wherein the indication comprises a call to a disaster recovery service.

20. The system of claim 18, wherein obtaining said copy of said self-describing backup of the file system metadata server includes retrieving the copy from a cloud-based storage associated with the file system metadata server.

21. The system of claim 18, wherein obtaining said copy of said self-describing backup of the file system metadata server includes accessing the backup catalog to locate the backup.

22. The system of claim 18, wherein the backup is used to provide access to a read only instance of the file system metadata server at least in part by using the backup to instantiate an instance of the file system metadata server running in a virtual machine.

23. The system of claim 18, wherein the processor is further configured to store the file system metadata associated with write operations in the local cache associated with the read only instance of the file system metadata server.

24. A computer program product embodied in a non-transitory computer readable storage medium and comprising computer instructions for:
receiving an indication to provide alternative access to a file system metadata server that provides file system metadata if a primary instance of the file system metadata server for the file system metadata has failed;
obtaining a copy of a self-describing backup of the file system metadata server from a backup catalog, wherein the self-describing backup of the file system metadata server comprises information sufficient to create a read only instance of the file system metadata server, and to initialize the read only instance of the file system metadata server; and
using the backup to provide access to a read only instance of the file system metadata server, wherein:
one or more write operations that are received from one or more nodes are intercepted by an interposition layer and locally cached until the primary instance of the file system metadata server is restored,
the one or more operations being with respect to the file system metadata provided by the file system metadata server, and
in response to a subsequent operation being received and a determination that the subsequent operation is with respect to data associated with the one or more write operations, using at least a value stored in a local cache corresponding to at least one of the one or more write operations that are cached.

25. The computer program product of claim 24, wherein obtaining said copy of said self-describing backup of the file system metadata server includes retrieving the copy from a cloud-based storage associated with the file system metadata server.

* * * * *